US006279460B1

(12) United States Patent
Pope

(10) Patent No.: US 6,279,460 B1
(45) Date of Patent: Aug. 28, 2001

(54) TEA BREWING FUNNEL

(75) Inventor: Randy D. Pope, Edinburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 09/422,679

(22) Filed: Oct. 21, 1999

(51) Int. Cl.[7] .................................................. A47J 31/02
(52) U.S. Cl. .............................. 99/299; 99/306; 99/323; 426/433
(58) Field of Search ........................... 99/299, 306, 283, 99/323; 426/433, 429, 432

(56) References Cited

U.S. PATENT DOCUMENTS

| 1,962,165 | * | 6/1934 | Wilcox ............................ 99/306 X |
| 1,990,508 | * | 2/1935 | Wilcox ............................ 99/306 |
| 2,856,844 | | 10/1958 | Price ............................... 99/299 |
| 4,527,467 | | 7/1985 | Siemensma ...................... 99/279 |
| 4,642,190 | * | 2/1987 | Zimmerman ..................... 99/306 X |
| 5,927,179 | * | 7/1999 | Mordini et al. .................. 99/306 X |

* cited by examiner

Primary Examiner—Reginald L. Alexander
(74) Attorney, Agent, or Firm—Barnes & Thornburg

(57) ABSTRACT

The present invention provides a novel tea brewing funnel for prolonging the steep time of a brewed beverage. The funnel has a sump in its bottom surface having a drain aperture therein. A delay mechanism is provided in the funnel and formed of a housing having top and bottom openings and an orifice near the bottom opening. A cap is fitted over the top opening and a filter assembly is fitted into the orifice. The filter assembly allows brewed beverage into the housing while excluding any brewing substance. The bottom of the housing is inserted into the drain aperture so that the filter assembly rests in the sump and the housing sits within the funnel. A tube assembly is positioned within the housing through the drain aperture and connects to the housing, connecting the delay mechanism to the funnel. When in use, brewed beverage is formed in the funnel. Brewed beverage flows through the filter assembly and rises in the housing at the same rate as does brewed beverage within the funnel. When brewed beverage within the housing reaches a height higher than that of the tube assembly within the housing, the brewed beverage enters the tube and drains from the funnel. Once the brewed beverage begins to drain out of the funnel through the delay mechanism, the remainder of the brewed beverage within the funnel is drained through the delay mechanism by a siphon process.

17 Claims, 2 Drawing Sheets

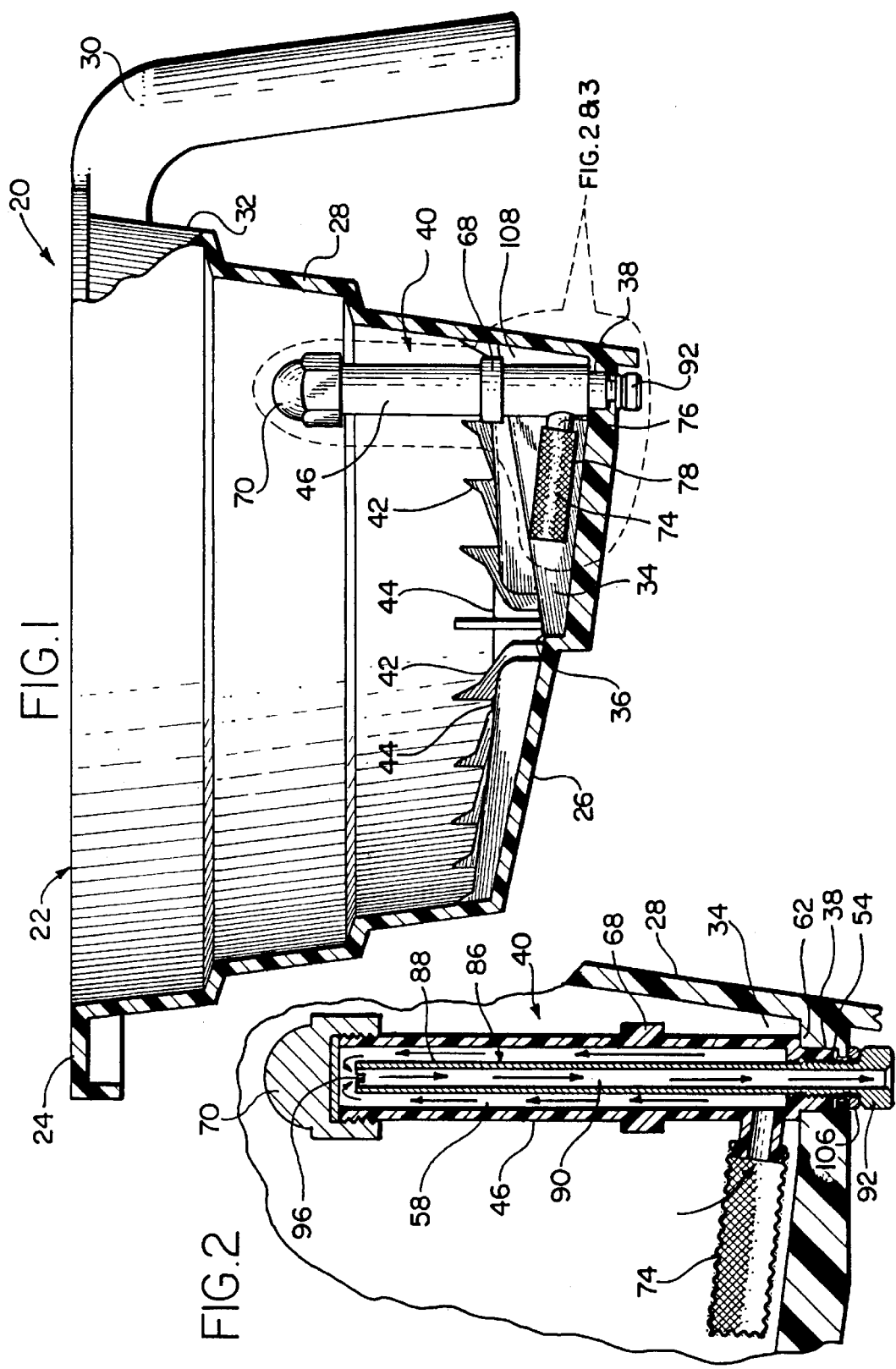

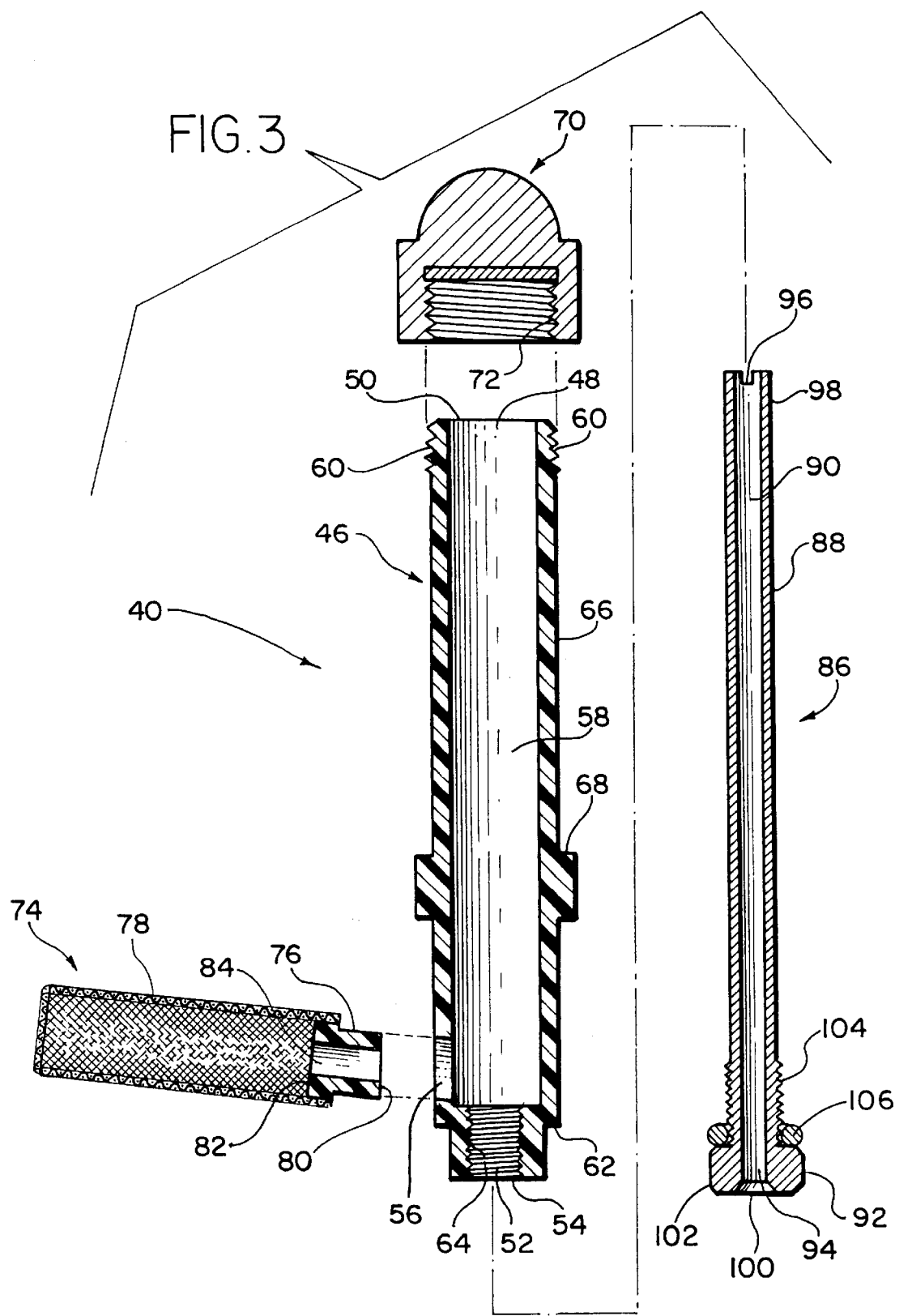

TEA BREWING FUNNEL

BACKGROUND OF THE INVENTION

This invention relates to a brewing funnel having a delay mechanism therein for prolonging the steep time of a brewed beverage within the brewing funnel prior to the brewed beverage being drained from the brewing funnel.

Generally, brewing funnels do not have any means by which to prolong the steep time of a brewed beverage therein. Commonly, water is sprayed into a brewing funnel containing a charge of brewing substance. The water is then infused with the brewing substance to create a brewed beverage. However, because there is no mechanism to control the steep time of the brewed beverage, the final product that is drained from the brewing funnel is a combination of brewed beverage with a long steep time and brewed beverage with a short steep time. This inconsistency in the infusion process provides for an inconsistent tasting brewed beverage.

Other brewing funnels which do contain means for prolonging the steep time, however, also cause other problems for the user. The delay mechanisms can be lost or damaged during the cleaning of the brewing funnel. For instance, if a delay mechanism is not securely attached to the brewing funnel, the delay mechanism may be lost in the garbage when a user bangs the brewing funnel over a receptacle to remove any unused brewing substance contained therein. The user may not realize right away that a piece of the delay mechanism was lost during this process until the next time the funnel is used, which may be too late. But, if a delay mechanism is permanently attached to the brewing funnel, the brewing funnel and delay mechanism will cause other problems in cleaning both the brewing funnel and the delay mechanism.

Reports have also surfaced that when the steep time of a brewed beverage is too short, bacteria that is contained in the brewing substance is not killed off by the infusion process. These reports have stated that as the steep time for a brewed beverage is extended, more bacteria will be killed within the brewed beverage.

OBJECTS AND SUMMARY OF THE INVENTION

An object of the present invention is to prolong the steep time of a brewed beverage prior to the brewed beverage draining from a brewing funnel.

Another object of the present invention is to prolong the steep time of the brewed beverage, thereby providing a better tasting brewed beverage.

Yet another object of the present invention is to prolong the steep time of a brewed beverage, thereby killing any bacteria that may exist within the brewed beverage.

Another object of the present invention is to provide a delay mechanism that is securely attachable to a brewing funnel so that the delay mechanism itself, or pieces thereof, will not be lost or broken when the brewing funnel is cleaned out or in use.

Another object of the present invention is to provide a delay mechanism that is detachable from a brewing funnel so that the delay mechanism, as well as the brewing funnel, can be thoroughly and separately cleaned.

A further object of the present invention is to provide a delay mechanism that has many detachable parts, thereby allowing easy cleaning of each and every piece of the delay mechanism.

Another object of the present invention is to provide a delay mechanism that will prevent a brewing substance from entering it and thereby possibly clogging the delay mechanism.

Briefly, and in accordance with the foregoing, the present invention provides a novel tea brewing funnel for prolonging the steep time of a brewed beverage. The brewing funnel has a sump in its bottom surface, as well as a drain aperture in the sump proximate to the sidewall of the brewing funnel. A delay mechanism is provided in the brewing funnel. The delay mechanism is formed of a housing having top and bottom openings and an orifice near the bottom opening. A cap is fitted over the top opening and a filter structure is fitted into the orifice. The filter structure allows brewed beverage into the housing while excluding any brewing substance. The bottom of the housing is inserted into the drain aperture so that the filter structure rests in the sump and the housing sits within the brewing funnel. A tube assembly is positioned within the housing through the drain aperture and connects to the housing, connecting the delay mechanism to the brewing funnel. When in use, brewed beverage is formed in the brewing funnel. Brewed beverage flows through the filter structure and rises in the housing at the same rate as does brewed beverage within the brewing funnel. When brewed beverage within the housing reaches a height higher than that of the tube assembly within the housing, brewed beverage enters the tube assembly and drains from the brewing funnel. Once the brewed beverage begins to drain out of the brewing funnel through the delay mechanism, most, if not all, of the brewed beverage within the brewing funnel is drained from the brewing funnel and through the delay mechanism by a siphon process.

BRIEF DESCRIPTION OF THE DRAWINGS

The features of the present invention which are believed to be novel are set forth with particularity in the appended claims. The organization and manner of the structure and operation of the invention, together with further objects and advantages thereof, may best be understood by reference to the following description taken in connection with the accompanying drawings wherein like reference numerals identify like elements in which:

FIG. 1 is a cross-sectional side view of the brewing funnel having the delay mechanism therein.

FIG. 2 is a cross-sectional side view taken from the structure within the dotted lines of FIG. 1 of the delay mechanism illustrating the route a brewed beverage would flow through the delay mechanism prior to draining from the brewing funnel.

FIG. 3 is cross-sectional, exploded side view taken from the structure within the dotted lines of FIG. 1 of the delay mechanism.

DETAILED DESCRIPTION OF THE ILLUSTRATED EMBODIMENTS

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

A brewing funnel 20 is shown in FIG. 1. The brewing funnel 20 has a generally frustroconical shape with a mouth 22 which is defined by an annular lip 24. The brewing funnel 20 also has a bottom surface 26. A sidewall 28 generally continuously extends around the brewing funnel 20 between the annular lip 24 and the bottom surface 26. A handle 30 is also provided for on an outside surface 32 of the sidewall 28.

The bottom surface 26 of the brewing funnel 20 has a sump 34 therein. The sump 34 generally extends from a center portion 36 of the bottom surface 26 to the sidewall 28. A drain aperture 38 is also provided in the sump 34. The drain aperture 38 is positioned at the lowest point within the sump 34. The lowest point within the sump 34 in the preferred embodiment is generally proximate to the sidewall 28. The sump 34 is dimensioned such that a delay mechanism 40 can rest within the sump 34, as well as be attached to the brewing funnel 20 via the drain aperture 38. The delay mechanism 40 will be described in more detail herein.

A plurality of flanges 42 are also formed on the bottom surface 26. The flanges 42 extend from the sidewall 28 toward the center portion 36 of the bottom surface 26. The flanges 42 provide a plurality of chasms 44 above the bottom surface 26 for a brewed beverage to flow through after the brewed beverage drips through a brewing filter, which may be used to support a charge of brewing substance that is infusing with hot water. If a brewing filter is used, the flanges 42 would also support the brewing filter.

The delay mechanism 40 is also attached to the brewing funnel 20. As best illustrated in FIG. 3, the delay mechanism 40 has a housing 46 having a top opening 48 at a top portion 50 of the housing 46, a bottom opening 52 at a bottom portion 54 of the housing 46, and an orifice 56 proximate to the bottom portion 54 of the housing 46. A passage 58 is provided within the housing 46 between the top opening 48 and the bottom opening 52. The housing 46 has external threads 60 at its top portion 50. The bottom portion 54 of the housing 46 has a diameter smaller than a diameter of the top portion 50 of the housing 46, thereby providing a bottom portion shoulder 62. The housing 46 has internal threads 64 at its bottom portion 54. A shoulder 68 is also provided on an outside surface 66 of the housing 46.

The delay mechanism 40 also has a cap 70. The cap 70 has internal threads 72 and is connected to the top portion 50 of the housing 46. The internal threads 72 of the cap 70 and the external threads 60 at the top portion 50 of the housing 46 threadedly attach to each other, thereby allowing the cap 70 to attach to the housing 46 and completely cover and seal the top opening 48 of the housing 46. Because the cap 70 and the housing 46 are threadedly connected, the cap 70 and the housing 46 can be easily attached to or detached from each other.

The delay mechanism 40 also has a filter structure 74. The filter structure 74 is formed of a hollow adapter 76 and a screen 78. A first end 80 of the hollow adapter 76 connects to the housing 46 through the orifice 56 of the housing 46, thereby connecting the hollow adapter 76 to the passage 58 within the housing 46. The screen 78 is connected to a second end 82 of the adapter 76. The screen 78 covers an opening 84 at the second end 82 of the adapter 76. The screen 78 is generally formed of a mesh wiring having open spaces therein.

The delay mechanism 40 also has a tube assembly 86. The tube assembly 86 is formed of a cylinder 88 attached to a tip 92. The cylinder 88 is hollow 90 and the tip 92 has a bore 94 therethrough. The bore 94 of the tip 92 is in connection with the hollow 90 of the cylinder 88, thus the tube assembly 86 has a top opening 96 at a top portion 98 of the cylinder 88 and a bottom opening 100 at a bottom portion 102 of the tip 92. The tip 92 has a diameter that is larger than a diameter of the cylinder 88. The cylinder 88 has external threads 104 proximate to the tip 92. An o-ring 106 is positioned around the cylinder 88 between the external threads 104 of the cylinder 88 and the tip 92.

The delay mechanism 40 is attached to the brewing funnel 20 by placing the bottom portion 54 of the housing 46 of the delay mechanism 40 into the drain aperture 38. When the bottom portion 54 of the housing 46 is inserted into the drain aperture 38 of the brewing funnel 20, the bottom portion shoulder 62 rests on the sump 34 around the drain aperture 38. The filter structure 74 then extends within the sump 34 from the delay mechanism 40, which is proximate to the sidewall 28, toward the center portion 36 of the bottom surface 26 of the brewing funnel 20. The housing 46 of the delay mechanism 40 thus extends, proximate to the sidewall 28, within the brewing funnel 20 from the drain aperture 38 within the sump 34 toward the mouth 22 of the brewing funnel 20. The length of the housing 46 can be varied based on the size of the brewing funnel 20 that is being used. Also, in a preferred embodiment, the shoulder 68 of the housing 46 is dimensioned to fit snugly against a pair of walls 108 of the sump 34, thereby providing stability to the delay mechanism 40 as well as preventing rotation of the delay mechanism 40 during the attachment of the tube assembly 86 to the housing 46, as described hereinbelow.

When the bottom portion 54 of the housing 46 is properly placed within the drain aperture 38 and the filter structure 74 is extending toward the center portion 36 of the bottom surface 26, the tube assembly 86 can then be attached to the brewing funnel 20. The cylinder 88 of the tube assembly 86 is inserted into the drain aperture 38 from outside of the brewing funnel 20, such that the cylinder 88 extends into the passage 58 of the housing 46. The tube assembly 86 extends until the external threads 104 on the cylinder 88 come into contact with the internal threads 64 of the housing 46 at the bottom portion 54. The internal threads 64 of the housing 46 and the external threads 104 on the cylinder 88 are then threadedly connected to each other, thereby connecting the delay mechanism 40 to the brewing funnel 20. When the threaded connection is made, the o-ring 106 provides a fluid tight seal between the delay mechanism 40 and the drain aperture 38 of the brewing funnel 20. Also, when the threaded connection is made, the cylinder 88 within the passage 58 of the housing 46 extends such that the top opening 96 of the cylinder 88 is at a height within the passage 58 that is less than a height at the top opening 48 of the housing 46. The tube assembly 86 can also be connected to the housing 46, thereby allowing the delay mechanism 40 to be kept separate from the brewing funnel 20 if desired, either for cleaning or otherwise. The positioning of the delay mechanism 40 within the brewing funnel 20, generally proximate to the sidewall 28, also allows for easy insertion of a brewing filter into the brewing funnel 20.

In normal operation, the delay mechanism 40 is connected to the brewing funnel 20 as described hereinabove. A charge of brewing substance is then deposited into the brewing funnel 20. A brewing filter may or may not be used to support the charge of brewing substance. The brewing funnel 20 is then inserted into a brewing machine where hot water is sprayed into the brewing funnel 20 and over the brewing substance within the brewing funnel 20. The hot water and the brewing substance infuse together to form a brewed beverage.

As best illustrated in FIG. 2, the brewed beverage then enters the delay mechanism 40 through the filter structure 74. The filter structure 74 also helps prevent any of the brewing substance from entering the delay mechanism 40. The brewed beverage flows through the filter structure 74 and into the passage 58 of the housing 46. As the hot water continues to be sprayed into the brewing funnel 20, the brewed beverage rises within the passage 58 and around the cylinder 88 of the tube assembly 86 at the same rate as the brewed beverage and/or water contained within the brewing funnel 20, yet outside of the delay mechanism 40. When the brewed beverage within the passage 58, and thus the brewed beverage and/or water contained within the brewing funnel 20 reaches a height that is higher than that of the top opening 96 of the cylinder 88 of the tube assembly 86, the brewed beverage within the delay mechanism 40 spills into the hollow 90 of the cylinder 88 and drains through the delay mechanism 40 and into a container positioned below the brewing funnel 20. The steep time of the brewed beverage within the brewing funnel 20 is prolonged by the brewed beverage having to rest within the brewing funnel 20 until the brewed beverage spills over into the hollow cylinder 88 of the delay mechanism 40. Thus, the steep time can be set to any time desired by controlling the time before the brewed beverage is allowed to spill over into the hollow cylinder 88. It is desirable to prolong the steep time of the brewed beverage because the longer the steep time is for the brewed beverage, the more flavor that will be extracted from the brewing substance, thereby providing a better tasting brewed beverage. There have also been reports that the longer steep time that a brewed beverage has, the more likely it will be that any bacteria that was contained within the brewing substance was killed.

Further, once the brewed beverage has begun its process of draining through the delay mechanism 40, most, if not all, of the brewed beverage within the brewing funnel 20 is drained through the delay mechanism 40 by a siphoning process.

When the draining process is complete, the brewing funnel 20 can be removed from the brewing machine. The delay mechanism 40 can then be removed from the brewing funnel 20 allowing for easy cleaning of the brewing funnel 20. The delay mechanism 40 can then also be disassembled, thereby allowing for easy cleaning of each and every piece that comprises the delay mechanism 40. Also, if the delay mechanism 40 is left in the brewing funnel 20 during cleaning, because the delay mechanism 40 is attached to the brewing funnel 20, the delay mechanism 40 will not be lost during the cleaning of the brewing funnel 20.

The invention is claimed as follows:

1. A delay mechanism for use with a brewing funnel having a drain aperture, said delay mechanism comprising:
   a) a housing having a top opening at a top portion of said housing, a bottom opening at a bottom portion of said housing and having a passage extending between said top and bottom openings, and an orifice proximate to said bottom portion of said housing;
   b) a cap connected to said top portion of said housing, said cap covering said top opening;
   c) a filter structure attached to said orifice and extending from said housing;
   d) a tube assembly comprising an elongated hollow cylinder and a tip having a bore therethrough, said bore of said tip being in direct connection with said hollow cylinder;
   e) said tip positioned proximate to a drain aperture outside of said funnel with said hollow cylinder protruding through said drain aperture into said funnel and extending into said passage of said housing, said bottom portion of said housing resting within said drain aperture within said funnel, said tube assembly secured to said housing at said drain aperture.

2. A delay mechanism as defined in claim 1, wherein said cylinder of said tube assembly has a height which is less than a height of said housing when said cylinder is positioned within said housing, said height of said cylinder being related to the steep time of a brewed beverage.

3. A delay mechanism as defined in claim 1, wherein said filter structure comprises a hollow adapter positioned within said orifice connecting said hollow adapter to said passage of said housing, and a screen connected to said adapter.

4. A delay mechanism as defined in claim 3, wherein said screen extends from said adapter, said screen formed of a mesh wiring defining open spaces therein, said open spaces dimensioned to exclude brewing substance from entering the housing through the hollow adapter yet allow brewed beverage to enter the housing through the hollow adapter.

5. A delay mechanism as defined in claim 1, wherein said bottom portion of said housing has a diameter equal to or less than a diameter of said drain aperture, said bottom portion fitting within said drain aperture.

6. A delay mechanism as defined in claim 1, wherein said cap is threadedly attached to said housing for allowing said cap to be attached or removed from said housing.

7. A delay mechanism as defined in claim 1, wherein said tube assembly is threadedly attached to said housing for allowing said tube assembly to be attached or removed from said housing.

8. A delay mechanism as defined in claim 7, wherein said tube assembly further comprises a sealing structure, said sealing structure positioned around said cylinder proximate to said tip.

9. A delay mechanism as defined in claim 8, wherein said sealing structure rests between said threading of said tube assembly and said tip of said tube assembly, said sealing structure providing a fluid tight seal between said delay mechanism and said drain aperture of said funnel.

10. A brewing funnel assembly for extending the steep time of a brewed beverage, comprising:
    a) a funnel body defining a mouth and an interior surface;
    b) a sump formed in said interior surface of said funnel body;
    c) a drain aperture in said sump; and
    d) a delay mechanism connected to said funnel body communicating with said drain aperture;
    said delay mechanism comprising a housing having a top opening at a top portion of said housing, a bottom opening at a bottom portion of said housing, a passage extending between said top and bottom openings, an orifice proximate to said bottom portion of said housing, a cap covering said top opening of said housing, a filter structure attached to said orifice and extending from said housing, and a tube assembly comprising an elongated hollow cylinder and a tip having a bore therethrough, said bore of said tip being in direct connection with said hollow cylinder, said tip positioned proximate to said drain aperture outside of said interior surface of said funnel with said hollow cylinder protruding through said drain aperture into said funnel and extending into said passage of said housing, said bottom portion of said housing resting within said drain aperture within said funnel, said tube assembly attached to said housing at said drain aperture.

11. A brewing funnel assembly as defined in claim 10, wherein said cap is threadedly attached to said housing for allowing said cap to be attached or removed from said housing.

12. A brewing funnel assembly as defined in claim 10, wherein said tube assembly is threadedly attached to said housing for allowing said tube assembly to be attached or removed from said housing.

13. A brewing funnel assembly as defined in claim 12, wherein said tube assembly further comprises a sealing structure, said sealing structure positioned around said cylinder proximate to said tip.

14. A brewing funnel assembly as defined in claim 13, wherein said sealing structure rests between said threading of said tube assembly and said tip of said tube assembly, said sealing structure providing a fluid tight seal between said delay mechanism and said drain aperture of said funnel.

15. A brewing funnel assembly as defined in claim 10, wherein said bottom portion of said housing has a diameter equal to or less than a diameter of said drain aperture, said bottom portion fitting within said drain aperture.

16. A brewing funnel assembly as defined in claim 10, wherein said cylinder of said tube assembly has a height which is less than a height of said housing when said cylinder is positioned within said housing, said height of said cylinder being related to the steep time of a brewed beverage.

17. A method of prolonging the steep time of a brewed beverage within a brewing funnel assembly, said brewing funnel assembly having a funnel body defining an interior surface and a mouth, a sump formed in said interior surface, a drain aperture formed in said sump, and a delay mechanism connected to said funnel body, said delay mechanism including a housing having a passage between a top opening of said housing at a top portion of said housing and a bottom opening of said housing at a bottom portion of said housing and an orifice proximate to said bottom portion of said housing, a cap connected to said top portion of said housing, said cap covering said top opening, a filter structure attached to said orifice and extending from said housing, and a tube assembly comprising an elongated hollow cylinder and a tip having a bore therethrough, said bore of said tip being in direct connection with said hollow cylinder, said tip positioned proximate to said drain aperture outside of said interior surface of said funnel body with said hollow cylinder protruding through said drain aperture into said funnel body and extending into said passage of said housing, said bottom portion of said housing resting within said drain aperture within said funnel body, said tube assembly attached to said housing at said drain aperture, comprising the steps of:

a) placing a charge of brewing substance within said funnel body;

b) dispensing heated water into said funnel body and over said charge of brewing substance;

c) infusing said water with said charge of brewing substance to form a liquid brew;

d) gravitating said liquid brew into said sump, then through said filter structure and said orifice, and into said passage;

e) continuing dispensing of water into said funnel body to raise said liquid brew within said passage around said elongated hollow cylinder, said liquid brew rising within said passage relative to a height of water and liquid brew within said funnel body outside of said delay mechanism;

f) siphoning said liquid brew in said funnel body and in said passage into and through said hollow cylinder and said tip when said liquid brew rises to a height in said passage which is above said cylinder; and g) draining said liquid brew into a container positioned below said funnel body.

* * * * *